UNITED STATES PATENT OFFICE.

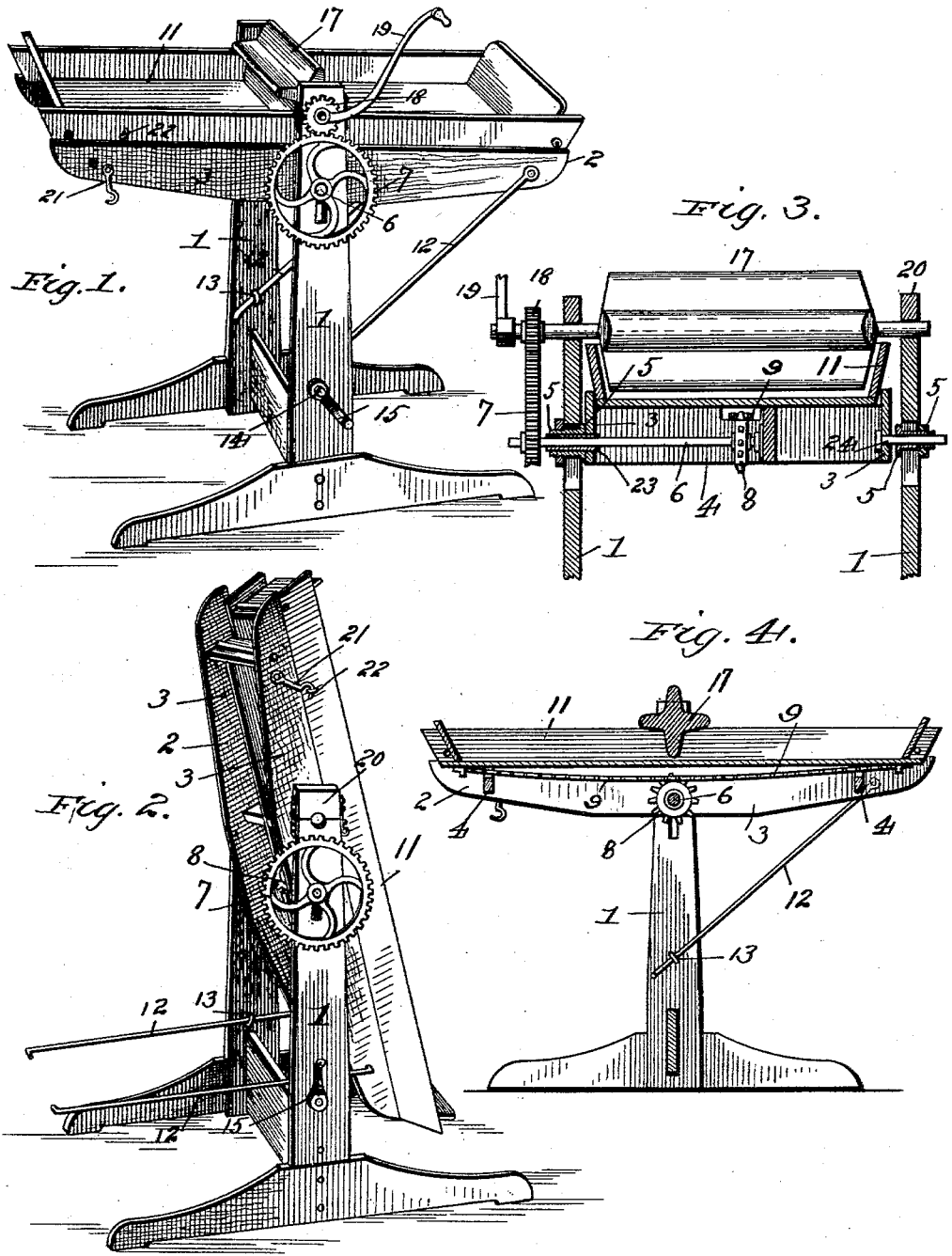

WADSWORTH F. WATERS, OF JOHNSON, VERMONT.

BUTTER-WORKER.

SPECIFICATION forming part of Letters Patent No. 563,698, dated July 7, 1896.

Application filed April 25, 1896. Serial No. 588,997. (No model.)

*To all whom it may concern:*

Be it known that I, WADSWORTH F. WATERS, a citizen of the United States, residing at East Johnson, in the county of Lamoille and State of Vermont, have invented certain new and useful Improvements in Butter-Workers, of which the following is a specification, reference being had therein to the accompanying drawings, in which—

Figure 1 is a perspective view of my improved butter-worker in operative position. Fig. 2 is a similar view showing it in its folded position. Fig. 3 is a cross-sectional view, and Fig. 4 is a longitudinal vertical section thereof.

The invention relates to that class of butter-workers in which the butter is placed in a movable tray and subjected to the action of a revolving beater, the tray being caused to reciprocate under the beater as said beater revolves; and it consists in certain novel combination and arrangement of parts hereinafter fully described, and particularly set forth in the claims appended.

Referring to the various parts by numerals, 1 1 designate a pair of suitable vertical posts, which are mounted upon a suitable base. Between the upper ends of these posts, midway between its ends, is pivoted a frame 2. This frame is substantially equal in width to the space between the posts and consists of the two side bars 3 and end bars 4, connecting them. The pivots 23 and 24 of the frame extend outwardly from the side bars 3 and pass through tubular bolts 5, which are adjustably mounted in slots in the post 1, as shown in Fig. 3.

The pivot 23 of the frame 2 is tubular and through it extends a shaft 6, which carries on its outer end a large gear-wheel 7, its inner end being journaled in a bearing secured to a bar 16, which connects the end bars of the frame. A sprocket-wheel 8 is secured on said shaft at the center of the frame 2, said wheel engaging a sprocket-chain 9, which is secured at its ends to the under side of the tray 11. This tray fits between the side bars of the frame 2 and is approximately equal in width to said frame and is of suitable length. The chain 9 is secured to each end of the tray at the center thereof.

To support the frame in either a horizontal position or at any inclination, a rod 12 is pivoted at its upper end to each of the side bars, the lower end of each rod passing through a loop 13 of a bolt 14, which extends through each post 2. Each bolt 14 is provided with a nut 15, by which the loop 13 may be drawn tightly against the posts to bolt the rods 12 in their adjusted position.

The butter-working roller 17 is journaled in the upper ends of the post 1 and fits within the tray 11 and extends transversely thereof. On one end of the shaft of said roller is secured a small gear 18, which meshes with the gear 7, and an operating-crank 19 is secured to the said shaft adjacent the small gear 18. This roller is removably journaled in the posts 1 and may be removed by swinging open part 20 of the journal-box.

To hold the tray upon the frame when it is in the position shown in Fig. 2, hooks 21 are secured to the frame and are adapted to engage loops 22, secured to the tray, as shown in Fig. 2.

It will thus be seen that the tray in operation may be inclined toward either side or maintained in a horizontal position.

It will also be noted that when the device is not in use the roller 17 may be removed and the frame placed in an almost vertical position, thereby adapting it for storage in a much smaller space than would be possible if the frame and tray were permanently secured in a horizontal position. The tray is reciprocated slowly as the worker is revolved, as will be readily understood.

By means of the bolts 5 and slots in the posts 1 the frame and tray may be lowered from the roller 17, and by means of the tubular pivot the shaft 6 will be relieved of all strain of supporting the frame and tray. The roller 17 is formed with four radial blades 25, which in cross-section are approximately V-shaped, their outer edges being rounded as shown.

Having thus fully described my invention, what I claim, and desire to secure by Letters Patent, is—

1. In a butter-worker the combination of a pair of supports, a frame pivoted between said supports, rods pivoted to said frame and adjustably secured to the supports, a tray carried by the frame, a butter-working roller fitting said tray, means for revolving said roller and means for reciprocating the tray upon the frame, substantially as described.

2. In a butter-worker the combination of a pair of supports, a frame pivoted between said supports, rods pivoted to said tray and adjustably secured to the supports, a tray carried by the frame, a chain 9 secured to said tray, shaft 6 extending through one of the pivots of the frame, a sprocket carried by the shaft and engaging chain 9, gear 7, roller 17, removably journaled in the supports, gear 18, and crank 19, substantially as described.

3. In a butter-worker the combination of a pair of supports, a frame pivoted between them, rods pivoted to said frame, means for adjustably securing said rods to the supports, whereby the frame may be held at any incline, means for vertically adjusting the frame on the supports, a tray carried by the frame, means for reciprocating said tray, a butter-working roller and means for rovolving it, substantially as described and set forth.

In testimony whereof I affix my signature in presence of two witnesses.

WADSWORTH F. WATERS.

Witnesses:
EDWARD E. HOLMES,
GEORGE E. MONTEITH.